July 21, 1936. R. G. BREENE ET AL 2,047,948
COWLING FOR AIRCRAFT MOTORS
Filed Oct. 24, 1929    3 Sheets-Sheet 1
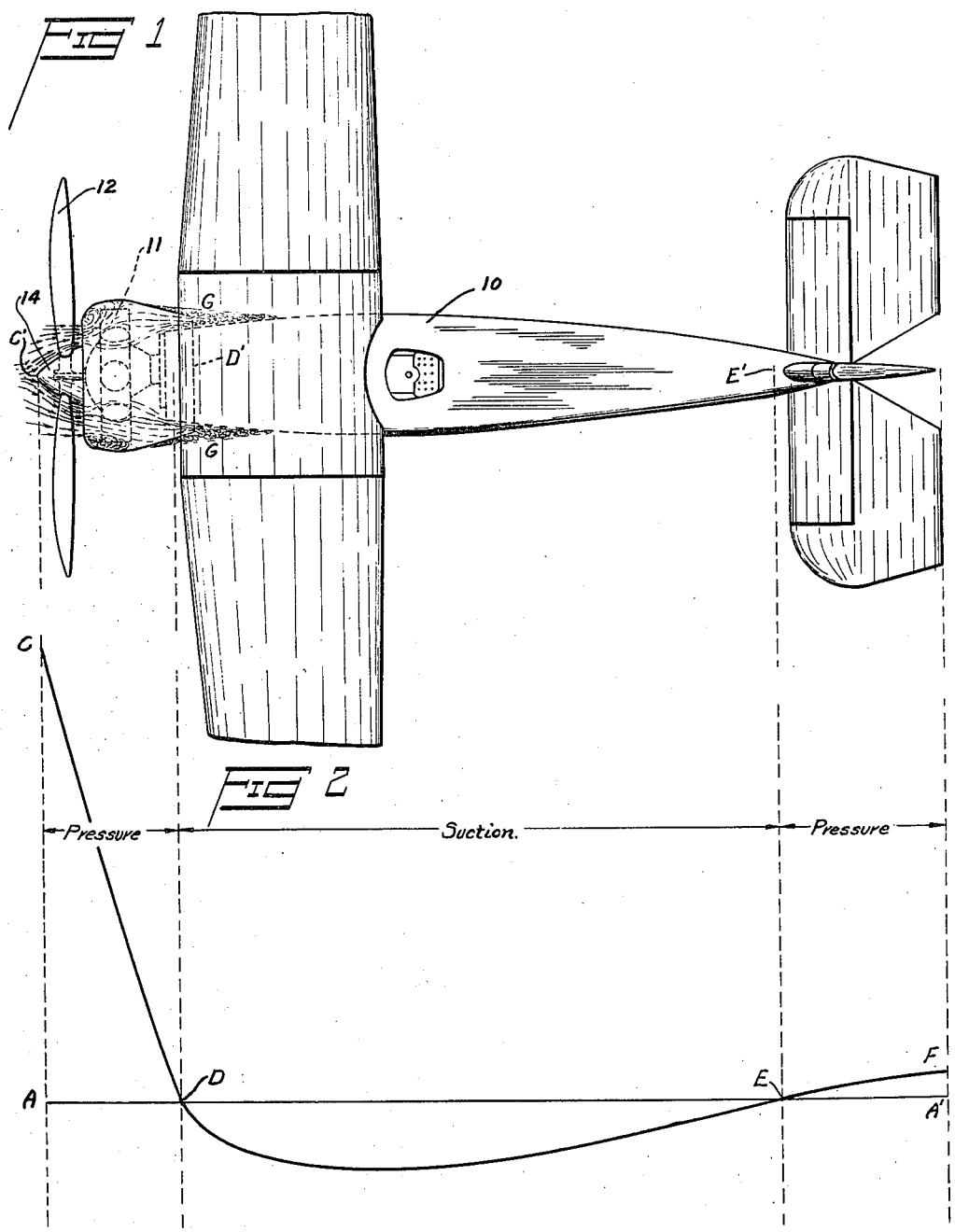
INVENTORS
Robert G. Breene. Carl F. Greene.
James B. Brelsford.
BY
ATTORNEY July 21, 1936.  R. G. BREENE ET AL  2,047,948
COWLING FOR AIRCRAFT MOTORS
Filed Oct. 24, 1929   3 Sheets-Sheet 2

INVENTORS
Robert G. Breene, Carl F. Greene
James B. Brelsford
BY
ATTORNEY

July 21, 1936.  R. G. BREENE ET AL  2,047,948
COWLING FOR AIRCRAFT MOTORS
Filed Oct. 24, 1929   3 Sheets-Sheet 3
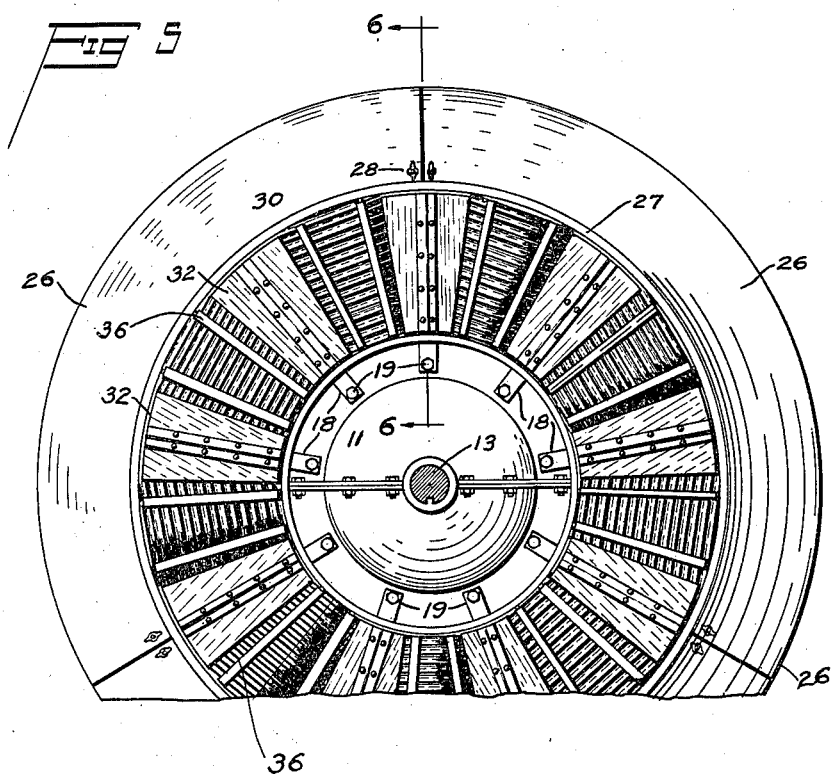
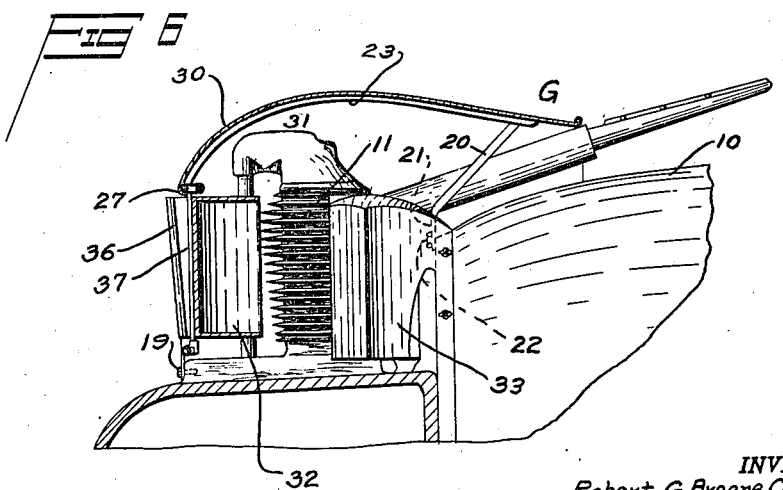
INVENTORS
Robert G. Breene, Carl F. Greene
James B. Brelsford.
BY
ATTORNEY Patented July 21, 1936

2,047,948

UNITED STATES PATENT OFFICE 2,047,948

COWLING FOR AIRCRAFT MOTORS

Robert G. Breene, Carl F. Greene, and James B. Brelsford, Dayton, Ohio

Application October 24, 1929, Serial No. 402,196

4 Claims. (Cl. 244—31)

(Granted under the act of March 3, 1883, as amended April 30, 1928; 370 O. G. 757).

This invention described herein may be manufactured and used by or for the Government for governmental purposes, without the payment to us of any royalty thereon.

The present invention relates generally to improvements in the stream lining and cooling of aircraft engines and more particularly to the cooling of engines of the type having stationary radially disposed air cooled cylinders at the nose of the fuselage.

The object of the invention is to reduce the drag of such aircraft without unduly diminishing the cooling effect on the engine cylinders. It has been found as a result of wind tunnel tests on airplane fuselages that for a short distance along the nose of the fuselage, there is formed an area of rather high pressure when the airplane is in flight; that is to say, an air pressure more or less above the normal atmospheric pressure. This is the natural result of the movement of the fuselage through the air. Wind tunnel tests further show that back of the just described pressure area there is a somewhat longer suction area. By "suction area" is meant an area in which the pressure is below the normal atmospheric pressure. The invention consists in the provision of a particular form, disposition and curvature of engine cowling, and adjunctive air guides or vanes within said cowling. The form, disposition and curvature of the engine cowling take advantage of the stated conditions to provide an adequate air flow over the engine cylinders and at the same time reduce the drag effect which they would otherwise impose, whereas the adjunctive air guides and vanes locally reduce the cross area of the air flow passage through said cowling to thereby increase the air velocity flow adjacent to the heat-radiating fins of the engine cylinders.

As will be recognized by those skilled in the art, and as has been demonstrated in practice, the cooling air, which is separated from the outside air, is returned rearwardly and with little disturbance thereof. Preferably, the air outlet at the rear end of the cowling is of smaller effective area than the air inlet at its forward end.

The invention is further characterized by providing a cowling such as hereinbefore described having manually adjustable and radially extending closures for the air intake opening which closure when in a closed position conforms to the normal shape of the cowling. When the air striking the cylinders is unusually cold, as for instance when the airplane is flying at a great altitude or is in a long dive, these closures may be practically closed against the cowling.

With the above and other objects in view, our invention consists in the novel construction and arrangement of parts which will be hereinafter described, pointed out in our claims and illustrated in the accompanying drawings in which Fig. 1 is a plan view of an airplane having a cowling mounted thereon in accordance with our invention.

Fig. 2 is a curve obtained as the result of wind tunnel tests showing approximately the location of the pressure and suction areas around the fuselage of an airplane when it is in flight.

Fig. 5 is a front view of the engine cowling and

Fig. 6 is a sectional view taken on the line 6—6 of Fig. 5.

Corresponding parts are designated by corresponding numerals throughout the drawings.

Figure 3:
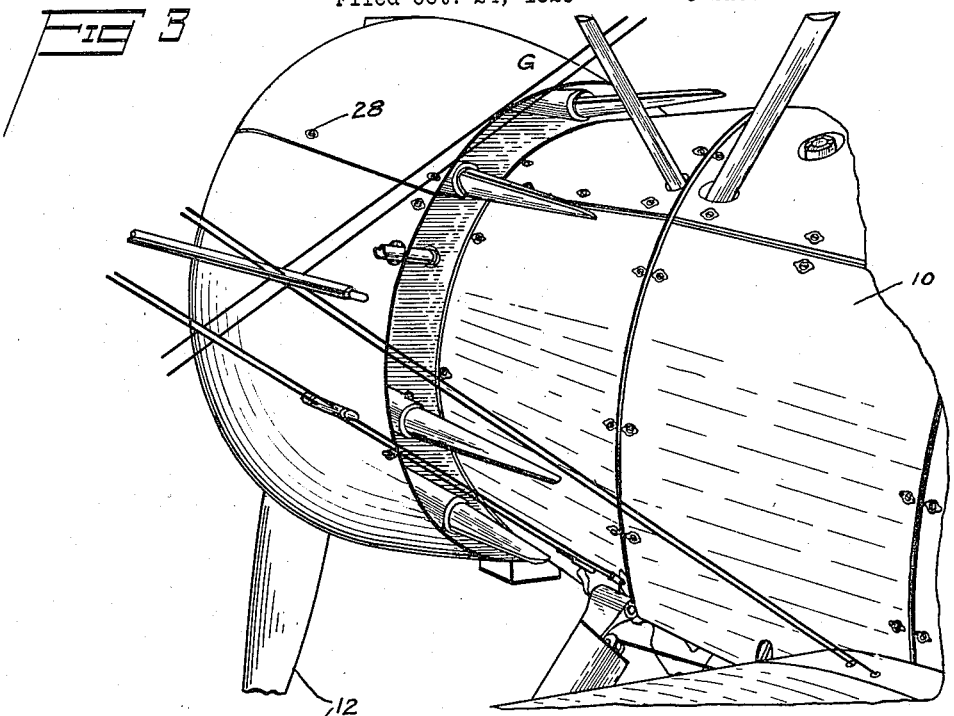
Fig. 3 is a view in perspective of the cowling shown mounted upon the engine nacelle of an airplane.

Referring now to Figs. 1 and 2, the numeral 10 designates a typical airplane fuselage having a stationary radial cylinder air-cooled engine of conventional design mounted at the front thereof in the usual manner. The engine 11 carries a propeller 12 mounted on the propeller shaft 13 of the engine. A spinner 14 of conical form with its apex directed forwardly is attached to the propeller hub.

Referring now to the curve shown in Fig. 2, the line A—A', which is equal to the length of the single aerodynamic structure of which the fuselage 10 forms a part, represents the line of zero pressure. Points above the line A—A' indicate pressure above atmospheric, while points below said line indicate pressure below atmospheric. The pressure curve is indicated at C, D, E, F. This curve is intended to illustrate qualitative values only and is not intended to indicate any definite units of pressure.

Referring now to the curve C, D, E, F, it will be noted that the highest pressure is at the point C at the extreme tip of the single aerodynamic structure comprising the fuselage 10 and engine cowling. From the point C the pressure rapidly drops off to the point D, where the curve crosses the axis A—A' at which point the pressure is substantially atmospheric pressure. From the point D, the curve goes below the line A—A', indicating a suction area; that is to say a pressure below atmospheric pressure. The curve crosses the axis again at point E, and terminates at the point F, the area back of the point E thus being a pressure area.

Referring now to Fig. 1 the pressure area is indicated between C' and D'. The suction area is indicated between points D' and E'. This invention is not concerned with the pressure areas corresponding to the E—F part of the curve.

Figure 4:
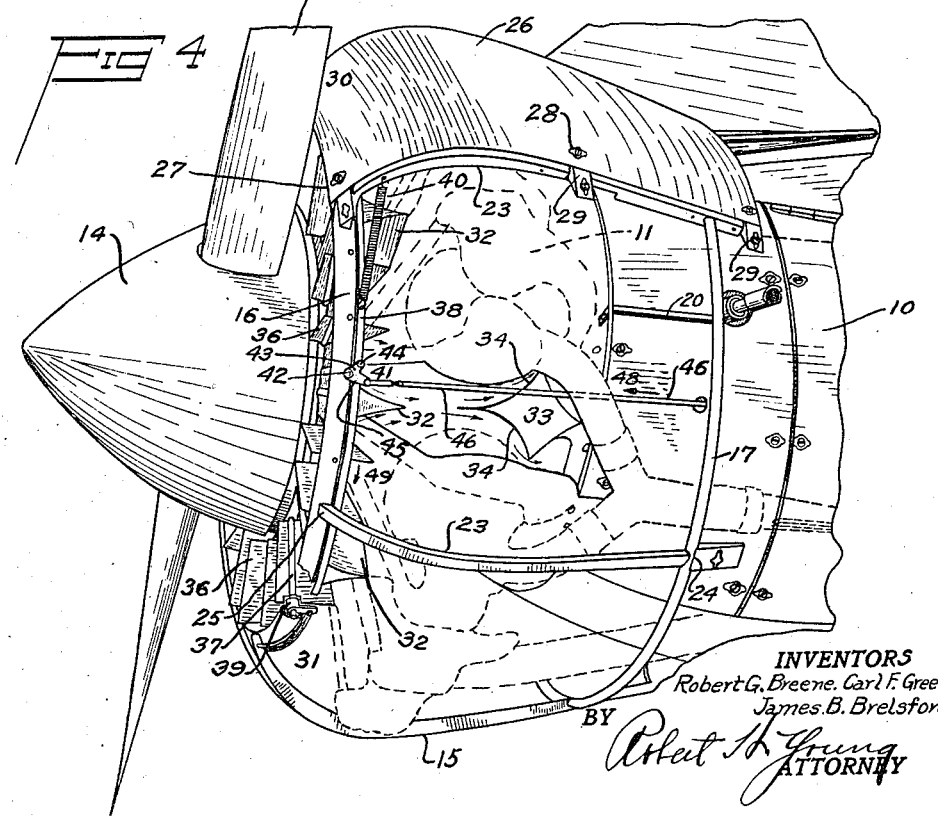
Fig. 4 is a view in perspective showing the closure means and vane arrangement.

Referring now to Figs. 3 and 4, a circular framework 15, which comprises essentially a front ring member 16 and a rear ring member 17 concentrically arranged relative to the front ring member, is provided, the front ring member being attached to the crank case of the engine by means of a series of radially extending lugs 18 provided on the ring member. These lugs are provided with suitable openings for receiving bolts 19 which are screwed into tapped holes provided in the crank case in the usual manner as shown in Fig. 6 of the drawings.

The rear ring member 17 is secured to the front end of the fuselage by means of a plurality of radially arranged angularly extending brace rods 20 suitably secured to the ring member at their one ends as by welding, the other ends of the said rods having flattened portions 21 provided with openings for passing bolts 22 therethrough which are screwed into the fuselage, thereby establishing a substantially rigid anchorage at that point.

The frame work 15 further includes the use of plurality of longitudinally extending supporting trusses 23 secured at spaced points 24 and 25 around the peripheries of the front and rear ring members respectively which are so shaped as to define approximately the contour of the cowling. The cowl plates forming the covering for the framework may be divided into two or more similarly formed pieces 26, the forward ends of which are hook-shaped as at 27 to fit around and under the forward edge of the front ring member 16. From the foregoing, it will be apparent that the cowl plates when mounted upon the framework are securely anchored at the forward end against displacement. Cowl fasteners 28 are attached along the forward end and the sides of the cowl plates and are so located as to be coincident with openings provided in attaching plates 29 fixedly mounted on the supporting trusses 23. The cowl fasteners may be of any conventional design which will securely hold the cowl plates against displacement or vibration; otherwise they form no essential part of the present invention. It will be noted that the cowling lies for the major part within the pressure area C'—D' and is arranged in a manner such that the rear edge of the cowling extends partially within the suction area D'—E'; that is to say at a point within the suction area and adjacent the pressure area. By positioning the intake opening of the cowling and the exhaust opening in the pressure and suction areas respectively a better air flow is obtained both within and without the cowling.

The shape of the cowling which is of substantially ring form is important. It is of sharper curvature or deeper camber in its forward part than in its rearward part which is flatter, and its front edge is curved inward directly in front of the cylinder heads so as to define a relatively blunt-nose entry for the structure as well as an air entrance opening for the cowling which is of less effective area than the projected area of the engine, and is wholly contained within said area just abaft the propeller, while the flatter rear part of the cowling extends to the rear of the cylinders and into overlapping relation or juxtaposition with the front of the covering 10 of the fuselage or nacelle, forming therewith a rearwardly facing narrow air outlet opening which runs substantially continuously around the body. The individual cylinder exhaust pipes may project through this opening as indicated. Such cowling preferably converges slightly from its forward toward its rear end, but in any event forms, in conjunction with the external contour of the body covering 10, the characteristic shape of a single properly streamlined body, or substantially so, the cowling thus virtually being a forward continuation of the lines of the streamlined body contour and giving rise to pressure and suction areas in the relation above referred to. The cowling provides a passage through it for the flow of air against and between the cylinder barrels and in order that the air may be best utilized for abstracting the engine heat, air guiding or deflecting means may be and preferably are provided for locally increasing the air velocity adjacent to the cylinders. To this end, a plurality of radially arranged vanes 32 are provided which are mounted upon the front ring member and positioned intermediate adjacent cylinders of the engine which are for the purpose of directing the air flow around the cylinders. A plurality of similarly constructed deflecting vanes 33 mounted intermediate the cylinders and in line with the front vanes are secured to the fuselage of the airplane, the purpose of which is to complete the circulation of air around the rear of the cylinders; the rear vanes being formed with concave sides 34 to carry the foregoing into effect. These air deflectors, it may be pointed out, cooperate with the form of cowl above described, to increase the heat-radiating properties of the engine, at the same time decreasing the drag of the body and engine combination, and preferably the deflecting surfaces 33 are of greater circumferential width than the intercylinder spaces in order not merely to increase the velocity flow of the cooling air near the cylinders or in contact with the fins but also to direct it toward those portions of the cylinders which might otherwise tend to overheat.

The engine temperature is controlled through the use of a system of manually controlled shutters disposed intermediate the propeller and engine and comprise essentially a plurality of radially arranged shutters 36 pivotally mounted as at points 37 to the ring member. The shutters are operated through the use of a ring piece 38 which is pivotally connected to a ring member 39 attached to each shutter respectively as shown in Fig. 4. The shutters are maintained normally in an open position through the use of a spring 40 attached to the ring piece 38 at one end and to one of the supporting trusses at the other end. A bell crank 41 is pivotally attached to the front ring member at point 42, one arm of which, designated by numeral 43, is pivoted as at point 44 to the ring piece 38, the other arm 45 being pivoted to a longitudinally extending manually operated shaft 46 which enters the pilot's cock pit. From the foregoing description, it will be apparent that in the event that shaft 46 is moved in the direction of the arrow 48, the ring piece 38 will be revolved in the direction of the arrow 49 to partially or wholly close the shutters, while a movement of the shaft 46 in the opposite direction will effect an opening of the shutters.

While we have illustrated and described the preferred form of construction for carrying our invention into effect, it is to be understood that variations and modifications may be made without departing from the spirit of our invention.

It is also to be understood that the term "body" as used herein includes fuselages, nacelles, or other streamlined air-craft bodies at the forward end of which an engine and propeller are disposed.

We, therefore, do not wish to be limited to the precise details of construction set forth but desire to avail ourselves of such variations and modifications as come within the scope of the appended claims.

Having thus described our invention, what we claim as new and desire to secure by Letters Patent is:

1. In aircraft, in combination, a body, a stationary radial cylinder air-cooled engine having heat radiating fins on the engine cylinders, said engine being mounted at the forward end of said body, a propeller driven by and mounted forwardly of said engine, and means for increasing the heat radiating properties of the engine and decreasing the drag of the body and engine combination comprising a cowl of substantially ring form within which the engine is completely enclosed, said cowl being shaped to provide a substantially unbroken forward continuation of said body and being curved relatively abruptly inwardly at its forward end between the engine and the propeller to provide therebetween a relatively blunt-nose entry for said cowl and body combination, said cowl throughout its rearward part being of less degree of curvature and extended rearwardly for some distance behind the engine and into substantially overlapping relation to said body, said cowl being open in front and in back, the front end opening being intermediately located between the engine and propeller and within the projected disc area of the engine, and the rear end opening being rearwardly faced and disposed at said overlap to extend substantially continuously around said body, and means within the cowl organized to increase the velocity of flow locally of the cylinders and shaped to deflect the air in its passage through the intercylinder spaces toward those portions of the engine cylinders which might otherwise tend to overheat.

2. In aircraft, in combination, a body, a stationary radial cylinder air-cooled engine having heat radiating fins on the engine cylinders, said engine being mounted at the forward end of said body, a propeller driven by and mounted forwardly of said engine, and means for increasing the heat radiating properties of the engine and decreasing the drag of the body and engine combination comprising a cowl of substantially ring form within which the engine is completely enclosed, said cowl being shaped to provide a substantially unbroken forward continuation of said body and being curved relatively abruptly inwardly at its forward end between the engine and the propeller to provide therebetween a relatively blunt-nose entry for said cowl and body combination, said cowl throughout its rearward part being of less degree of curvature and extended rearwardly for some distance behind the engine, and the cowl being open in front and in back, and a plurality of air directing surfaces intermediately located with relation to the engine cylinders and shaped to direct the cooling air in its passage through said cowl toward the rear portions of the engine cylinders, each said surface having a circumferential width exceeding that of its associated intercylinder space.

3. In aircraft, in combination, a body, a stationary radial cylinder air-cooled engine having heat radiating fins on the engine cylinders, said engine being mounted at the forward end of said body, a propeller driven by and mounted forwardly of said engine, and means for increasing the heat radiating properties of the engine and decreasing the drag of the body and engine combination comprising a cowl of substantially ring form within which the engine is completely enclosed, said cowl being shaped to provide a substantially unbroken forward continuation of said body and being curved relatively abruptly inwardly at its forward end between the engine and the propeller to provide therebetween a relatively blunt-nose entry for said cowl and body combination conducive to a smooth external air flow, said cowl throughout its rearward part being of less degree of curvature and extended rearwardly for some distance behind the engine and into substantially overlapping relation to said body, said cowl being open in front and in back, the front end opening being intermediately located between the engine and the propeller and within the projected disc area of the engine, and the rear end opening being rearwardly faced and disposed at said overlap to extend substantially continuously around said body, and air-deflecting surfaces within said cowl intermediately located with relation to the engine cylinders shaped to deflect the cooling air in its passage through said cowl toward the rear portions of the engine cylinders, the air after its passage rearwardly beyond said air-deflecting surfaces being discharged from said cowl through said outlet in a direction substantially parallel to the direction of the flow of air passing externally over the cowl and body combination.

4. In aircraft, in combination, a body, a stationary, radial cylinder air-cooled engine mounted at the forward end of said body, a propeller driven by and mounted forwardly of said engine, and an annular cowling surrounding said engine and extended rearward of the cylinders to form with the body a single structure of substantially streamlined contour, the cowling at its forward end being curved relatively abruptly inward in front of the engine cylinders and behind the propeller to provide a blunt entry for the aircraft, and an air entrance located wholly within the projected disc area of the engine, said cowling toward its rearward end being slightly convergent inwardly behind said cylinders, said convergent part forming a narrow annular air outlet located at the forward end of said body and extending substantially continuously around the same.

ROBERT G. BREENE.
CARL F. GREENE.
JAMES B. BRELSFORD.